(12) United States Patent
Hall

(10) Patent No.: US 9,152,922 B2
(45) Date of Patent: Oct. 6, 2015

(54) METHODS, APPARATUS, AND COMPUTER PROGRAM PRODUCTS FOR QUANTUM SEARCHING FOR MULTIPLE SEARCH TARGETS

(75) Inventor: Robert J. Hall, Berkeley Heights, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 764 days.

(21) Appl. No.: 12/639,557

(22) Filed: Dec. 16, 2009

(65) Prior Publication Data

US 2011/0145288 A1 Jun. 16, 2011

(51) Int. Cl.
*G06F 7/00* (2006.01)
*G06F 17/30* (2006.01)
*G06N 99/00* (2010.01)
*B82Y 10/00* (2011.01)

(52) U.S. Cl.
CPC .............. *G06N 99/002* (2013.01); *B82Y 10/00* (2013.01)

(58) Field of Classification Search
None
See application file for complete search history.

(56) References Cited

U.S. PATENT DOCUMENTS

| 6,317,766 | B1* | 11/2001 | Grover | 708/400 |
| 6,496,476 | B1* | 12/2002 | Badt et al. | 370/228 |
| 6,980,981 | B2* | 12/2005 | Beavin et al. | 707/999.002 |
| 7,249,064 | B1* | 7/2007 | Carmen | 705/14.16 |
| 2003/0078913 | A1* | 4/2003 | McGreevy | 707/3 |
| 2005/0240716 | A1* | 10/2005 | Day et al. | 711/3 |
| 2006/0161557 | A1* | 7/2006 | Dettinger et al. | 707/100 |
| 2010/0046754 | A1* | 2/2010 | Gilfedder | 380/255 |
| 2010/0165195 | A1* | 7/2010 | Ratner et al. | 348/489 |

* cited by examiner

*Primary Examiner* — Fred I Ehichioya
*Assistant Examiner* — Jau-Shya Meng
(74) *Attorney, Agent, or Firm* — Myers Bigel Sibley & Sajovec, PA

(57) ABSTRACT

A first iterative Grover Search process is performed by causing at least one quantum computer to perform a first series of Grover Searches according to a characteristic function for varying numbers of iterations to identify a first search target. The characteristic function is modified according to the identified first search target. A second iterative Grover Search process is performed by causing the at least one quantum computer to perform a second series of Grover Searches according to the modified characteristic function beginning with a number of iterations determined based on a number of iterations required for at least one prior iterative Grover Search process to identify a second search target.

12 Claims, 6 Drawing Sheets

METHODS, APPARATUS, AND COMPUTER PROGRAM PRODUCTS FOR QUANTUM SEARCHING FOR MULTIPLE SEARCH TARGETS

BACKGROUND OF THE INVENTION

The present application relates generally to computing apparatus, methods and computer program products and, more particularly, to quantum computing apparatus, methods and computer program products.

Many software engineering tasks can be attacked as search problems. For example, a test generator searches for sets of inputs that result in branches or paths being covered, a finite state machine (FSM) verifier searches for inputs that lead to states where a given property is violated, and a synthesis tool searches for compositions of library components that have a specified behavior. Techniques and tools attacking software engineering problems have employed myriad search techniques, from simple exhaustive search through sophisticated heuristic searches, on sequential, parallel, and distributed platforms. While much progress has been made, and many such tools are used in practice today, these problems are NP-hard or worse and conventional tools may not solve such problems reliably. That is, while many current tools can do better than systematic brute force or random searches on some (or many) problems, they may be either heuristic or targeted at narrow sub-domains. Consequently, scaling remains a challenge in software engineering, due to the underlying problem complexity.

Quantum computing exploits the quantum mechanical phenomena of state entanglement and quantum interference to enable a very large number of computations to occur concurrently, with results discovered at the end through observation. Unfortunately, while it may be relatively straightforward to set up exponentially many quantumparallel computations, it may be much more difficult to read out the desired results reliably. As a result, with the exception of a few relatively narrow problem types, such as simulating, physics and factoring an integer, it appears that the best speedup achievable is quadratic. That is, where a classical search algorithm requires n steps, there may be a quantum variant requiring only $O\sqrt{N}$ steps. This may be achieved using the approach discovered by L. Grover in 1996, referred to as Grover's Search (GS) Algorithm. Such a speedup could have a major impact on practice, bringing spaces much too large for today's tools (e.g. $2^{64}$ states) into the reach ($2^{32}$ effort) of tomorrow's search tools.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments of the present invention provide quantum search methods. A first iterative Grover Search process is performed by causing at least one quantum computer to perform a first series of Grover Searches according to a characteristic function for varying numbers of iterations to identify a first search target. The characteristic function is modified according to the identified first search target. A second iterative Grover Search process is performed by causing the at least one quantum computer to perform a second series of Grover Searches according to the modified characteristic function beginning with a number of iterations determined based on a number of iterations required for at least one prior iterative Grover Search process to identify a second search target.

In some embodiments, performing the first iterative Grover Search process includes identifying a first number of iterations performed to identify the first search target, and performing the second iterative Grover Search process includes causing the at least one quantum computer to perform the second series of Grover Searches beginning with the identified first number of iterations. In some embodiments, performing a second iterative Grover Search process includes causing the at least one quantum computer to perform the second series of Grover Searches beginning with a number iterations determined based on a minimum number of iterations among numbers of iterations performed to identify respective search targets for a plurality of preceding Grover Search processes. In further embodiments, performing a second iterative Grover Search process further includes causing the at least one quantum computer to perform a Grover Search using a reinitialized number of iterations responsive to failure to find a search target after reaching a predetermined bound on a number of iterations.

In some embodiments, each of the first and second iterative Grover Search processes may use incrementally increasing and/or decreasing numbers of iterations for each succeeding Grover Search. In further embodiments, each of the first and second iterative Grover Search processes use numbers of iterations that vary according to a predetermined function for each succeeding Grover Search. The search for multiple targets may be terminated responsive to a total number of Grover Search iterations meeting a predetermined criterion.

Further embodiments provide a computer-readable medium having computer program code embodied therein, the computer program code including program code configured to perform the search operations described above.

Additional embodiments provide quantum search apparatus that includes at least one quantum computer and a controller operatively associated with the at least one quantum computer. The controller is configured to cause the at least one quantum computer to perform a first iterative Grover Search process including a first series of Grover Searches according to the characteristic function for varying numbers of iterations to identify a first search target, to modify the characteristic function according to the identified first search target and to cause the at least one quantum computer to perform a second iterative Grover Search process including a second series of Grover Searches according to the modified characteristic function beginning with a number of iterations determined based on a number of iterations required for at least one prior iterative Grover Search process to identify a second search target. Additional embodiments provide quantum search apparatus that include means for performing a first iterative Grover Search process including a first series of Grover Searches according to a characteristic function for varying numbers of iterations to identify a first search target, means for modifying the characteristic function according to the identified first search target and means for performing a second iterative Grover Search process including a second series of Grover Searches according to the modified characteristic function beginning with a number of iterations determined based on a number of iterations required for at least one prior iterative Grover Search process to identify a second search target.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
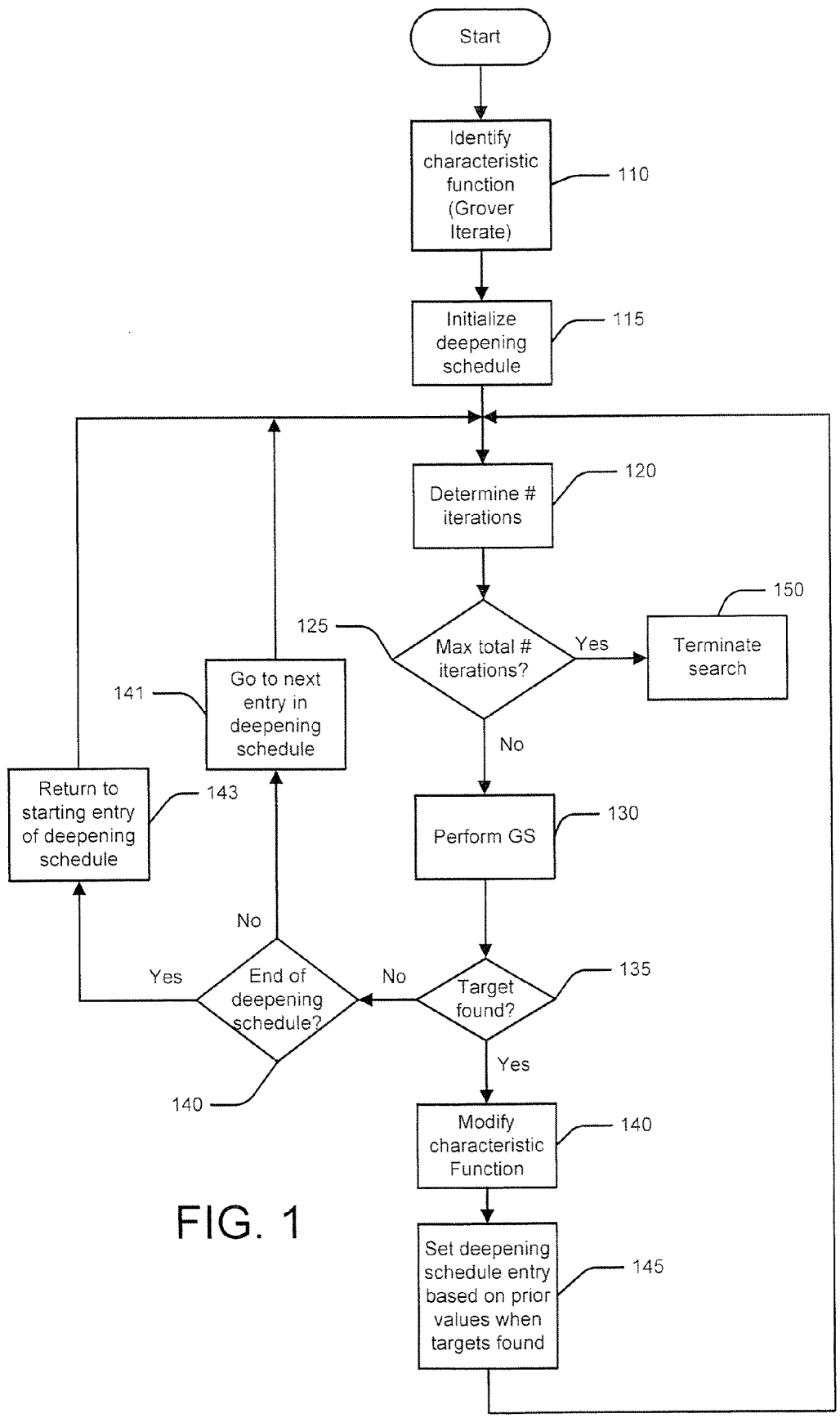
FIG. 1 is a flowchart illustrating quantum search operations according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore. "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having, a meaning that is consistent with their meaning, in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product including a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations discussed herein may be written in a high-level programming language, such as Java, C, and/or C++, for development convenience. In addition, computer program code for carrying, out operations according to some embodiments may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments are described hereinafter with reference to flowchart and/or block diagram illustrations of methods, systems, client devices, and/or computer program products in accordance with some embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Some embodiments of the present invention arise from a realization that software engineering search (SES) and other search problems may present challenges that may not be adequately addressed by conventional quantum search techniques. First, the number of search targets, such as covering inputs, error states, or synthesis solutions, may not be known in advance. This target weight indeterminacy (TWI) problem is significant, because conventional Grover Search (GS) techniques are generally suited to problems where this number is known in advance. Second, software tools usually try to find all search solutions rather than just one. For example, it may be more useful if a type checker finds as many type violations as possible rather than stopping after finding the first. For SES problems, it may be desirable that a quantum search algorithm be efficient at finding all, or at least many, solutions, rather than only one. Third, real world software artifacts tend to define large spaces, large spaces of inputs and large state spaces. A quadratic speedup, while significant, may not be sufficient to allow searching to completion in large spaces. Accordingly, to be useful in SES problems, it may be desirable that a quantum search algorithm produce as many solutions as possible in the time available. Some embodiments of the present invention involve use of Iterative Deepening Grover Search-Find All (IDGS-FA) techniques which may provide significant gains over other techniques. Such techniques may be used, for example, in software engineering search problems of widely different characters.

Many quantum search algorithms use or are derived from GS. In a GS problem, one may specify a search problem by providing a characteristic function, $f: \{0, 1\}^n \to \{0,1\}$, such that $f(x)=1$ if and only if x is one of the search targets to be found. A canonical example would be database search: the input integer represents a database key and the characteristic function implements the search criterion, with $f(x)$ returning 1 if and only if the database entry with key x matches the criterion. GS typically takes two arguments, one a particular representation of $f$ and the other a positive integer t representing the number of iterations to apply. S puts an n-bit quantum register (consisting of n quantum bits, or qubits) into a quantum superposition of all possible n-bit classical integers, and then applies a unitary quantum transformation, known as the Grover Iterate, t times. The Grover Iterate is constructed using $f$: effectively, each application of the iterate results in all possible computations of $f$ in quantumparallel, followed by some manipulation of the resulting quantum probability amplitudes. Each time the iterate is applied, it rotates the quantum state of the system a bit farther. At the end of the t iterations, GS observes the register, which selects one of the 2n possible n-bit integers randomly according to the probability distribution dictated by the quantum amplitudes. The art of applying GS may be viewed as lying in choosing the number of iterations so that the rotations proceed exactly far enough so that observing the register's state yields a search target with high probability. If the total number of search targets for $f$ is k, then if $t=\pi/4\sqrt{2^n/k}$, the observed output will be a search target with extremely high probability. If t is not exactly that value, then the probability of getting a search target is typically lower, varying in a complex way with t. GS puts out an n-bit (classical) integer either way: thus, the caller of GS evaluates $f$ on the output to see if it is a search target. GS is well suited to the case when the number of search targets k is known a priori, such as when searching a database for an entry matching a deterministic criterion such as social security number. This allows one to provide exactly the right number of iterations, resulting in a high probability of success.

To address the TWI problem, it may be desirable to provide a quantum search algorithm that does not require providing the exact number of GS iterations in advance. Iterative deepening may be used to select an approximate number of iterations to feed to GS. Similar to the well known AI search technique of the same name, iterative deepening involves successively increasing the number of iterations, testing to see if a solution is found after each phase. The succession of depths chosen is termed the deepening schedule.

A difficulty may lie in selecting a deepening schedule appropriately. If the schedule is too conservative, taking too-small steps, then it may perform too many steps before reaching the region of the correct value. On the other hand, if it is too aggressive, taking too-large steps, then it may overshoot the first occurrence of a good value and waste steps finding a much more costly higher value (or miss one entirely). IDGS is described in pseudocode below:

---

Procedure IDGS (f : CharacteristicFunction)
  For (i := 1 to InputSize(f), skipping 2) {
    Let r := GS(f, round($\frac{\pi}{4}\sqrt{2^i}$) in
    If (f(r) = 1) Then Return(r);
  }
  Return(-1);

---

The function InputSize returns the number of bits in the allowed inputs to $f$. It increases the number of iterations at each round by a factor of $\sqrt{2}$. Note that the iteration skips i=2, because $$\text{round}\left(\frac{\pi}{4}\sqrt{2^2}\right) = \text{round}\left(\frac{\pi}{4}\sqrt{2^3}\right)$$

and there is no point in calling GS twice with the same arguments. It is assumed that if a search target is found, it is returned as a nonnegative integer; if none is found, then −1 is returned. There are several related iterative approaches in (and some not in) the literature, including the Boyer, Brassard, Hoyer and Tap (BBHT) algorithm and Iterative Shallowing Grover Search (ISGS).

BBHT operates similarly to IDGS, but it adds a randomization step as follows. At each iteration, instead of a single determined choice, it randomly chooses the iteration amount between 1 and an upper bound L. It is L that increases systematically; at each round, L is multiplied by a constant factor between 1 and 4/3 (BBHT simulations described herein use L=1.2, a number recommended in the literature). ISGS, on the other hand, is similar to IDGS, except that the iteration amount starts at the largest IDGS value and gets smaller by a factor of $1/\sqrt{2}$ at each step.

To see whether a less conservative deepening schedule might be better, Doubled IDGS (DIDGS) has also been simulated herein: it is like IDGS, except instead of increasing i by 1 each time, it is increased by 2 each time. This has the effect of taking much larger steps (factor of 2 each time) between rounds, which can increase the risk of failure, but reduce total cost on success. The case studies described herein compare these approaches' costs and failure probabilities. IDGS, BBHT and DIDGS are referred to herein as "find-one" search procedures, because each is designed to find one search target per call.

Because of the probabilistic nature of quantum mechanical observation, one approach to the FA problem is simply to run IDGS (or one of the other find one algorithms in the previous subsection) over and over; each time the quantum state is observed, all search targets are equally likely to be found. Thus, over many repetitions, one expects eventually to see all search targets. However, this approach may find many search targets multiple times, and it may take many iterations to have high probability of seeing all of them. In fact, simulation studies show this technique to be far inferior in cost and failure probability to the approaches below.

In some embodiments of the present invention, to solve the FA problem, each time a search target is found, the characteristic function is altered (i.e. between calls to GS), so that that search target ceases to be a search target. This process is referred to herein as "marking the target." In classical computing, this may be achieved by storing found search targets in a hash table and checking the hash table during computation of $f$, returning 0 if the input is in the hash table. Access to such a hash table mechanism (or some other mechanism) may be included in constructing the Grover Iterate. Once this is implemented, solutions may be found by calling a find one search procedure over and over. This may be codified as a generic procedure MarkAndRepeat, psuedocode for which is presented below:

```
Procedure MarkAndRepeat (f : CharacteristicFunction,
                P : FindOne Search Procedure)
    Initialize marking memory to none-marked.
    Let r := -1 in
        Repeat
            r := P(f);
            If (r ≠ -1) { MARK(r); REPORT(r);}
        Until (r = -1);
```

MarkAndRepeat takes both a characteristic function and a find-one search procedure and applies the straightforward approach of iterating and marking until no target is found. The procedure MARK(r) may be left as a parameter, to be customized if desired by the caller of MarkAndRepeat. It implements marking, in some way that is used by the Grover Iterate to avoid returning a previously found search target, but it may take further actions. The procedure REPORT(r) may also left as a parameter, so the caller may customize it to take appropriate action on each found search target.

A potential inefficiency of a MarkAndRepeat process is that each time around the loop, the find-one procedure may re-execute the entire deepening schedule from the beginning. However, each time a search target is marked, the total target weight, while still unknown, decreases. This implies that the iterative deepening search is highly likely to proceed at least as far as it did in finding the most recent target. The last value of i encountered in the deepening may be remembered and the next deepening round started there instead of at 1.

According to some embodiments of the present invention, an IDGS-FindAll (IGDS-FA) procedure, shown as pseudocode below, incorporates these operations:

```
Procedure IDGS-FA (f : CharacteristicFunction)
    Initialize marking memory to none-marked.
    Let r := -1
        Ivals[k] := 1, for all 0 ≤ k < BUFSIZE
        IvalsPtr := 0;
        Repeat
            Let i := i0 := MinimumEntry(Ivals) in
                Repeat
                    r := GS(f, round(π/4 √2ⁱ));
                    If (f(r) = 1) Then {
                        Ivals[IvalsPtr] := i;
                        IvalsPtr := (IvalsPtr+1) mod BUFSIZE;
                        MARK(r); REPORT(r);
                    } Else {
                        r := -1;
                        i := i + 1; If (i = 2) Then i := 3;
                        If (i > InputSize(f)) Then i := 1;
                    }
                Until (r ≠ -1) or (i = i0)
        Until (r = -1);
```

The procedure IDGS-FA's internals are "in-lined", rather than called as a black-box. However, there may be a problem with simply remembering i and starting from there next round. Because of its quantum mechanical nature, GS is probabilistic, so there is a small but significant probability that it will fail to find the search target at the highest-likelihood round and instead proceed 1 or a few rounds beyond before finding one. If IDGS-FA proceeded blindly from that later round, it could waste GS iterations using a needlessly large i value. To combat this, IDGS-FA keeps a buffer of the BUFSIZE most recent i values resulting in search targets. To proceed to the next target after finding one, i.e. to proceed to the next iteration of the outer Repeat loop, it may use an initial i value equal to the minimum of all i values in the buffer (Ivals). This way, even if an unlikely event occurs and it proceeds too far in one outer round, it will still start the next outer round conservatively with the least i value remaining in the Ivals buffer. A simulation study indicates that BUFSIZE=5 leads to the least-cost runs over many problems.

IDGS-FA uses cyclic deepening. Since IDGS-FA may start each outer loop iteration at some i value greater than 1, there is a small statistical possibility that the search frontier (current i value) gets above the high-probability i range. In such cases, when IDGS-FA fails to find a search target at the highest i value, it wraps around back to 1. The process then proceeds until i reaches the initial i value ($i_0$). Thus, each outer loop iteration searches the same i range as IDGS, but cyclically.

It may be desirable that a quantum search solution for SES problems also deal with large spaces. For example, generating test cases for a function that accepts six 32-bit integer parameters represents a characteristic function operating on 192-bit inputs. Even $\sqrt{2^{192}}=2^{96}$ is likely an infeasible amount of effort for the foreseeable future. In some SES problems, large spaces may be attacked with abstraction, creating a small-space model of some more complex artifact. For example, a small finite state machine (FSM) model of a larger reactive system specification may be created, and a model checker run on the FSM model to search for design errors. Abstraction can be used to reduce the space size prior to applying quantum search techniques as well classical techniques.

Also, there may be some SES problems where abstraction is inapplicable or too hard to do. For example, software test generators are supposed to find input sets that cover paths in the actual code, not in a small model of the code. In software synthesis, there is a minimal functional complexity that is to be synthesized, and if this is too large, there may be no way to divide it up.

According to some embodiments, large spaces may be addressed using search cutoff. That is, the measure of computational cost may be taken as the number of GS iterations. A bound on total iterations may be set to be used by the search, and then the search may be stopped when this bound is reached. More precisely, prior to each call to GS(f,t), t may be added to a running total of iterations used: if the new sum is larger than the bound, the search procedure may be terminated. This simple cutoff mechanism can be applied to all of the search procedures discussed previously, including IDGS-FA.

The question may then be which search procedure can find the most solutions in a given time bound. A case study provided herein evaluates this. However, it may be observed that the iterative shallowing procedure ISGS starts with the hardest search ($\sqrt{2^{InputSize(f)}}$) first. For some spaces, this initial search itself may be intractable, so iterative shallowing may not find any solutions. Thus, ISGS may be inferior for large space problems.

FIG. 1 is a flowchart illustrating quantum search operations according to some embodiments of the present invention. A characteristic function corresponding to a search criterion is identified (block 110). In example embodiments, the characteristic function may be realized in a Grover Iterate construct. A Grover Iterate is a quantum computing concept defined in the literature: it is a particular unitary transformation on quantum states that combines evaluating the function f (whose characteristic function is given) with rotating the quantum state vector in the Hilbert space appropriate to the problem. A series of Grover Search processes are performed using a series of Grover Iterates to identify multiple search targets. For each Grover Iterate, an iterative series of Grover searches may be performed with varying numbers of iterations using a cyclic deepening strategy.

Still referring to FIG. 1, a deepening schedule is initialized, e.g., an initial entry in the schedule is selected (block 115). Based on the current entry in the deepening schedule, a number of iterations is determined (block 120). If this number of iterations does not cause a maximum total number of iterations to be exceeded, a Grover Search is performed using the current Grover Iterate (blocks 125, 130). After the Grover search for the given number of iterations is completed, the state of the quantum computer is determined and evaluated to determine if the state is a search target (block 135). If the search target is not found and the end of the deepening schedule has not been reached, the process goes to the next entry in the deepening schedule and a new number of iterations is determined (blocks 140, 141, 120). Alternatively, if the end of the deepening schedule has been reached, the process returns to the starting entry of the deepening schedule and the new number of iterations determined from that entry (blocks 140, 143, 120). As before, if the new number iterations does not cause the maximum number of total iterations to be exceeded, the process proceeds with another Grover Search using the new number of iterations (blocks 125, 130). The result of this search is evaluated as before, i.e., if a target is not found, the process moves to another entry in the deepening schedule.

Once a target is found (block 135), the characteristic function (Grover Iterate) is then modified based on the identified target (block 140). A new deepening schedule entry is selected based on the schedule entries when targets have been previously found, and the process returns to determining a number of iterations associated with this entry and performance of a Grover Search using the new Grover Iterate and the determined number of iterations (blocks 145, 120, 125, 130). The result of this Grover Search is evaluated as described above and, if no target is found, a new entry in the deepening schedule is selected and another Grover Search is performed using the associated number of iterations (blocks 135, 140, 141 or 143, 120, 125, 130). If it is determined that a maximum total number of iterations will be exceeded during any given pass through the loop, the search process is terminated (blocks 125, 150).

Figure 2:
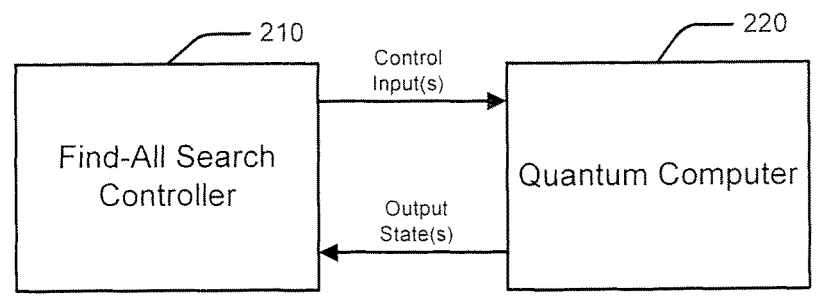
FIG. 2 is a block diagram illustrating a quantum search apparatus according to some embodiments of the present invention.

FIG. 2 illustrates a search apparatus according to further embodiments. The apparatus includes at least one quantum computer 220. A find-all search controller 210 is operatively associated with the at least one quantum computer 220 and is configured to implement find all search procedures along the lines discussed above in conjunction with the at least one quantum computer 220. In particular, the controller 210 may be configured to provide control inputs to cause the at least one quantum computer 220 to perform iterative series of Grover Searches by establishing and modify a characteristic function as described above, and is further configured to determine and evaluate output states of the quantum computer for purposes of identifying search targets. It will be appreciated that the quantum computer 220 generally may take any of a number of forms, as a wide variety of physical systems have been proposed for quantum computation. It will be further appreciated that the control inputs provided by the controller 220 may be appropriate for the physical system involved and may include, for example, hardware and/or combinations of hardware and software configured to provide the appropriate control inputs and to detect the output states of the quantum computer 220. For example, some proposed quantum computers may comprise atomic level systems that are configured to be controlled and/or monitored using lasers, electromagnetic fields and the like.

According to some embodiments. IDGS-FA operations along the lines discussed above may be used in the software engineering search context. Herein, a space of problems for which quantum search may be expected both to succeed and to be faster than classical approaches is discussed, including discussion of application of IDGS-FA to three SES applications. Each of these three applications has been implemented in simulation and run on examples.

Before proceeding to applications, it is worth considering when quantum search (based on Grover Search, as above) is likely to be cost effective. To help with this, a target weight w for a search problem may be defined as the ratio of the (absolute) number of search targets k to the total size of the search space ($2^{InputSize(f)}$). The find-one performance of IDGS is compared against that of classical search in FIG. 3.

For concreteness, a search procedure "Classical" is defined to operate as follows. At each iteration, Classical selects an n-bit input randomly from among those not yet selected and evaluates the characteristic function $f$ on it. It proceeds in this way until a search target is found.

One can show that the Classical search procedure's expected cost is $\Theta(2^n/t) = \Theta(1/w)$, classical iterations. This is the curve marked "classical" in FIG. 3. Because IDGS's deepening schedule results in a total number of iterations being the sum of a truncated geometric series with ratio $\sqrt{2}$, we expect IDGS's cost to be $\Theta(2^n/t) = \Theta(\sqrt{1/w})$. This is the curve marked "IDGS" in FIG. 3. Note that each search problem appears as a point on these curves. A number, cutoff, of Grover Iterations is fixed as an upper limit for acceptable cost. The w coordinate is the target weight for the problem, and the I coordinate is the number of iterations used by the corresponding search procedure to find a target. The space may be partitioned into three zones (I, II, and III). Point A is shown in Zone I. For points in Zone I, both IDGS and Classical will take more than the designated cutoff number of iterations, so no solutions will be found. Thus, GS-based search procedures may be of no help for problems in Zone I; the w at which IDGS requires at most cutoff iterations may be referred to a $w_{min}$. This is the boundary of Zone I.

Figure 3:
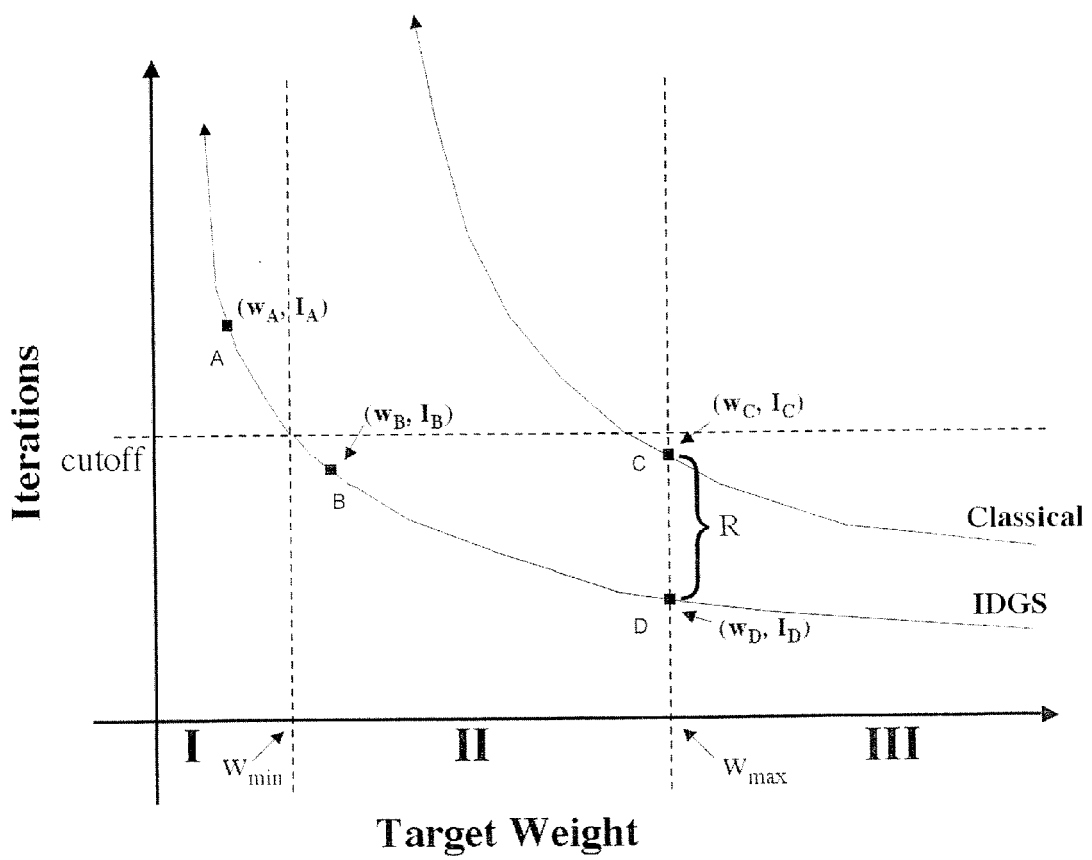
FIG. 3 is a graph illustrating a search operation space.

Even though an IDGS iteration may be viewed as doing the same information processing function (i.e., executing the characteristic function) as a Classical iteration, this does not necessarily mean the two have the same time cost. This relation will depend upon the technologies chosen. For example, one can parallelize the Classical computation to run 10 random guesses concurrently on 10 workstations, effectively decreasing the time cost per iteration by a factor of 10. In FIG. 3, the time cost ratio between one IDGS iteration and one classical iteration is denoted as R. Once the ratio between number of classical iterations and number of IDGS iterations falls below R, Classical is faster, so quantum search may be irrelevant. Since the iterations ratio depends inversely on $\sqrt{w}$, $w_{max}$ may be defined as the w at which the ratio is R. All problems lying to the right of $w_{max}$ may be defined to be in Zone III, in which Classical beats quantum search. Thus, in FIG. 3, $I_C/I_D=R$ and $w_C=w_D=w_{max}$. Either Classical or IDGS may be chosen at $w_{max}$.

With these definitions, quantum search may only be useful for find-one problems as long as $w_{min} \leq w \leq w_{max}$, such as for point B. This area is termed Zone II. This discussion is intended to be accurate, but parameterized by cutoff and $_R$. Also, if Classical or IDGS is improved, this may also change the quantitative picture, without altering the qualitative one shown in FIG. 3. An improvement to Classical (fewer iterations), will move $w_{max}$ to the left, since the curve will be lower. An improvement in Classical technology (e.g. by using 20 parallel nodes instead of 10) will increase R, also moving $w_{max}$ to the left. Improvements in quantum circuitry may move $w_{max}$ to the right, approaching 1 as R→1. For illustration, if the cutoff is be 2,000,000 (2e6) iterations, and the technology ratio R=10, then simulation studies show $w_{min} \approx 2^{-42}$ and $w_{max} \approx 0.0029675$.

This picture is useful for understanding find-all procedures as well. As long as the initial target weight of the problem falls within Zone II, the find-all procedure may return at least one solution and proceed in finding solutions up until the total cost reaches the cutoff bound. Each time a solution is found and marked, the target weight of the remaining problem decreases, so the point will move leftward in the diagram. Also, since some of the iteration bound has been used up, $w_{min}$ may move rightward, with the problem point crossing into Zone I when the entire search reaches cutoff.

The following describes techniques for checking correctness properties of finite state machines using quantum search. This is not intended to be fully general; rather, it is illustrative of one way to check some types of properties. A (deterministic) finite state machine M is a 4-tuple:

$$M \equiv [n, I, S_0 \in 2^n, \sigma: 2^n \times I \to 2^n]$$

where states are represented by n-bit integers, I is a finite input alphabet, $S_0$ is a distinguished start state, and $\sigma$ is the state transition function mapping a state and an input symbol to the next state, (ignore output alphabets and transition labels for this illustration).

A safety property may be defined to be a predicate P: $2^n \to \{0,1\}$. P(x)=1 iff x satisfies the property. A state failing P may be defined as a bad state; likewise, a state satisfying P may be a good state. It is generally desirable to know if any bad states are reachable from $S_0$. However, the reachability of a state is a global graph property of the entire state space. Quantum search based on GS cannot speed up an exhaustive enumeration of the space, at least in the worst case, because the worst case space requires exponentially many iterations of the next-state function to reach the deepest states. On the other hand, it may not be possible to simply search for all bad states: it is typical to design an FSM embedded in a large state space, with the intention that only a tiny fraction of all states are reachable. For example, an FSM that cyclically counts from 0 to 9 and back endlessly, likely uses states represented as 4-bit integers. Thus, 6 of the 10 states are not intended to be part of the FSM. A plausible correctness property could be that the state number is less than 10. If bad states were simply detected, it would uselessly return all states numbered higher than 9. If there is a reachable bad state, and if $S_0$ is good, then there must exist at least one edge state: a good state for which at least one transition exists to a bad state. So instead of searching for a reachable bad state, every state may be checked to see if it is an edge state. Pseudocode for such an edge detecting characteristic function, constructed from an FSM M and property P and suitable for use with IDGS-FA, is shown below:

```
Function Edgestate[M, P] (x : 2^nM)
    If (P(x) and ForSome i ∈ I_M, ¬P(σ_M(x,i)) ) {
        Return(1);
    }Else {
        Return(0);
    }
```

This (classical) algorithm may be translated into a suitable Grover Iterate. For example, this could detect states in which a supposed data invariant becomes violated, such as when a counter goes beyond a supposed upper bound, or when "the train enters the crossing with the arm not down." Identifying these states to the designer of the FSM model should allow finding and fixing errors.

A goal of a software test generator may be to discover a set of inputs that, when input to the code under test (CUT), together cover as many paths (branches, decisions, etc) as possible. The following describes how to apply IDGS-FA to path-coverage test generation, but the techniques can be adapted straight-forwardly for use with other coverage metrics. A tool that accepts the CUT may be built, for example, a source code procedure P, and produces a transformed source code procedure P'. For simplicity of exposition, it is assumed that P (and P') always takes a single n-bit integer argument and always terminates (discussion of encoding techniques enabling handling of complex data formats is provided below). P', instead of putting out the result put out by P for input x, puts out a representation of the code path taken during execution of P(x). We assume that each path in the code is represented by a unique bit-string identifying it; since there are only $2^n$ inputs, there are only $2^n$ path identifiers. In the simulation environment describe herein, such a tool has been implemented operating on Common Lisp DEFUN (function definition) forms. An example input and output of this tool are shown below:

```
(compute-coverage-fn
  '(Defun IS-NOT-PRIME? (x)
     (if (or (= x 0) (= x 1))
         1
         (if (= x 31787)
             7
             (let* ((upper (floor (sqrt x)))
                    (i 2))
               (while (and (<= i upper)
                           (not (zerop (mod x i))))
                 (incf i))
               (if (> i upper)
                   nil
                   i))))))
```

```
==>
(LAMBDA (X)
    (LET* ((_PATH 1))
        (BLOCK _OUTER-BLOCK
            (IF (LET* ((#:G2011 (= X 0)))
                    (IF #:G2011
                            (PROGN (EXTEND-PATH-0) #:G2011)
                            (PROGN (EXTEND-PATH-1) (= X 1))))
                (PROGN (EXTEND-PATH-0) 1)
                (PROGN (EXTEND-PATH-1)
                    (IF (= X 31787)
                            (PROGN (EXTEND-PATH-0) 7)
                            (PROGN (EXTEND-PATH-1)
                                (LET* (UPPER I)
                                    (SETQ UPPER (FLOOR (SQRT X)))
                                    (SETQ I 2)
                                    (IF (IF (<= I UPPER)
                                            (PROGN (EXTEND-PATH-0)
                                                (NOT (ZEROP (MOD X I))))
                                            (PROGN (EXTEND-PATH-1)
                                                NIL))
                                        (PROGN (EXTEND-PATH-0)
                                            (PROGN (INCF I)
                                                (WHILE (AND (<= I UPPER)
                                                        (NOT (ZEROP (MOD X I))))
                                                    (INCF I))))
                                        (PROGN (EXTEND-PATH-1) NIL))
                                    (IF (> I UPPER)
                                        (PROGN (EXTEND-PATH-0) NIL)
                                        (PROGN (EXTEND-PATH-1) I)))))))
        _PATH))
```

The coverage function (lower) collects the path identifier by extending it 1 bit at a time as each branch is taken, finally returning it as the value of the variable_PATH. A potential difficulty in applying IDGS-FA is that each time an input is found that covers a new path in the code, it is desirable to mark all other inputs leading down the same path as well. Otherwise, IDGS-FA could conceivably keep on returning new inputs that execute paths already covered. For example, all even inputs greater than 2 will execute the same path, ID=125, in the code shown above. To solve this, the characteristic function and MARK procedures may be constructed as shown in the following pseudocode:

```
Function CodeCoverage[P'] (x : 2^{n_P})
    Let path := P'(x) in
        If (InMarkingHashTable?(path)) {
            Return(0);
        } Else {
            Return(1):
        }
Procedure MARK[P'] (x : 2^{n_P})
    Let path := P'(x) in
        PutInMarkingHashTable(path);
```

A trick is for the characteristic function to return 1 if and only if the path executed by P on the input x is not in the marking table. Of course, the MARK procedure must enter the path identifier for x into the marking hash table (instead of x itself). Again, the characteristic function is translated into quantum form as the Grover Iterate.

An example of a synthesis problem is to construct code from a specification. While in general a very difficult problem, the following discussion focuses on library-based synthesis. In this approach, one may assume a library of components pre-existing and the search is for one or a simple assembly of such components that performs the specified function. This can be more tractable than first-principles synthesis, because the library components can encapsulate arbitrarily complex functionality.

To illustrate the application of quantum search, an example is speeding up generalized behavior-based retrieval (GBR). An idea of GBR is that the user specifies the synthesis problem by giving one or more sets of desired concrete input/output tuples; the task then is to find all component assemblies within a given depth bound that for each set of the given inputs compute the corresponding outputs. All such admissible assemblies are reported to the user as candidate programs.

For this illustration, it is assumed that all library components are 0-, 1- or 2-input functions without side effects. A subset of a floating point math library is a good example of such a case, where 0-ary functions are constants. There may be no clear way to map the doubly exponential (in assembly depth) collection of assemblies onto a single exponential-sized input space, where an input is represented by an integer. Instead, one may proceed as follows.

Using classical computation techniques, all possible assemblies may be precomputed out to a given depth d, creating an assembly library, which is a superset of the original library. The assembly library may be indexed so that each assembly gets a unique identifying integer between 0 and N−1. The original library may be indexed by integers so that each component has an identifier between 0 and K−1.

The characteristic function $f$ may behave as follows. Let n be the smallest n such that $2^n \geq KN^2$. Then $f$ accepts n-bit integers $x \in 2^n$. It decodes x as a triple (a, b, c) where $c \in \{0 \ldots K-1\}$ identifies a component, and $a,b \in \{0 \ldots N-1\}$ each identify an assembly. $f$ then proceeds to evaluate the d+1 depth assembly c(a, b) on each of the input sets in the user's query, computing the output for each. Finally, $f$ compares the resulting outputs to the corresponding ones in the user's query and returns 1 if and only if each output matches according to a match criterion specified by the user. Note that if the input fails to decode as a triple with all entries in the given ranges, $f$ puts out 0. IDGS-FA will then return all d+1 deep assemblies matching the query and having a two-input component as highest level operator. One can also do this search for 1-input components by decoding the input integer as a component identifier and a single assembly identifier; however, this is a much smaller search problem that is likely tractable classically.

Using the simulation framework, a simulated quantum GBR was implemented based on IDGS-FA. In one example, a library built from four input variables (x1, x2, y1, y2), four binary arithmetic operators (+, −, * ,/), and four unary operators (negate, reciprocal, square, and squareroot) was loaded. The tool built out an assembly library to 2 levels of unary applications plus 1 level of binaries, resulting in a library of 1608 distinct assemblies. A GBR query was issued with three concrete input/output pairs (listed as (x1; y1; x2; y2↦ output): (3, 4, 1, 2.1 ↦ 1.4866068 . . . ), (12.5, −4.5, −5.6,↦ 7.0859014 . . . ), and (8, 15, −13, −0.25 ↦ 14.5451882 . . . ). The search found the result, (SQRT(+ (SQUARE(+X1(NEGATE Y1)))(SQUARE(+X2(NEGATE Y2))))). The simulator reported that this result emerged after 3531 GS iterations, with the quantum parallelism examining 10,349,088 possible assemblies. The expectation value for a corresponding Classical search is 4,194,304 evaluations.

Since the integer encoding is based on library indices, the library components can operate on arbitrary data structures, including lists, arrays, and objects. The quantum parallelism is split up among distinct indices, with the Grover Iterate looking up the structure in the library and performing computations on it. This avoids the problem of having to directly encode pointers and memory addresses, which would drastically raise the bit-complexity of the encoding and reduce the reach of quantum search.

A simulation-based evaluation study carried out to compare IDGS, IDGS-FA, and the other candidate procedures will now be described. It is notoriously difficult in general to simulate quantum computing classically. To simulate an arbitrary n×n unitary quantum transformation acting on an n-qubit register, a matrix of size $2^{2n}$ is needed, and the state vector representing the quantum state of the register requires representing $2^n$ complex numbers. This may make it difficult to represent and simulate more than a few tens of qubits. Simulating the operation of GS, however, may allow an exponential shortcut. The Grover Iterate operates by (1) negating the numerical sign of each amplitude value representing a search target, and then (2) performing a rotation about the mean, which operates on all amplitudes. But note that there are really only two distinct amplitude values, those of search targets and all others. The algorithm can, therefore, operate only on two numbers. The pseudocode is shown below:

```
Procedure SimulateGS (f, t)
    Let SpaceSize := 2^InputSize(f)
        Target := Other := null
        NumTargets := NumOthers := 0 in
        For i := 0 up to SpaceSize − 1
            If (f(i) = 1)
                { NumTargets := NumTargets +1; Target := i; }
            Else
                { NumOthers := NumOthers +1: Other := i; }
        Let TargetAmp := OtherAmp := 1/√SpaceSize
        α := NumTargets / SpaceSize;
        β := NumOthers / SpaceSize; in
        Do t times {
            TargetAmp := − TargetAmp:
            Let x := (α TargetAmp + β OtherAmp) in
                TargetAmp := TargetAmp − 2x;
                OtherAmp := OtherAmp − 2x;
        }
        If (GetRandom01( ) ≤ αTargetAmp²)
            Return(Target);
        Else
            Return(Other);
```

The simulation accepts the characteristic function $f$ and the number of iterations t. It starts by exhaustively trying all possible inputs to $f$ and counting the number of search targets and others (non-search-targets). It also remembers one search target and one other. It then proceeds to compute the two quantum amplitude values by applying the Grover Iterate t times (body of the Do-loop). Finally, it calls the GetRandom01 procedure to pick a random number uniformly from [0; 1]; if that number is less than the square of the target amplitude, then the remembered search target is returned, otherwise the remembered Other is returned.

The step of exhaustively examining all inputs to $f$ costs $2^n$ steps on a classical computer, so using SimulateGS is strongly scale-bounded. However, much larger runs may be simulated if details of $f$ are not important. Therefore, the function SimulateGS-Abstract shown in pseudocode below, accepts, instead of a characteristic function, merely the number of search targets:

```
Procedure SimulateGS-Abstract (Nbits, Ntargs, t)
    Let SpaceSize := 2^Nbits
        NumOthers := SpaceSize − Ntargs
        TargetAmp := OtherAmp := 1/√SpaceSize
        α := NumTargets / SpaceSize;
        β := NumOthers / SpaceSize; in
        Do t times {
            TargetAmp := − TargetAmp;
            Let x := (α TargetAmp + β OtherAmp) in
                TargetAmp := TargetAmp −2x;
                OtherAmp := OtherAmp −2x;
        }
        Return(α TargetAmp²);
```

SimulateGS-Abstract skips the initial step of SimulateGS and goes directly to the Do loop. Finally, instead of returning an actual search target (or Other), it returns merely the probability that GS would return a search target, which is TargetAmp². The run-time cost of SimulateGS-Abstract is only proportional to t, the number of iterations, which may be never worse than $\sqrt{2^n}$. SimulateGS-Abstract is used to generate the study results below. This involves slight alterations to the pseudocode of IDGS, IDGS-FA, etc, in order to extract performance results, but these alterations are straight forward.

The three main candidate find-one procedures, IDGS, BBHT, and DIDGS, are compared. For find-one procedures, of interest are two metrics: the expected iterations cost of finding a search target and the probability of failing to find one. ISGS is omitted from these graphics, because (a) its cost is generally much higher than the other three, due to it starting with the maximum iterations, and (b) its failure probability is identical to that of IDGS, which is shown.

Figure 4:
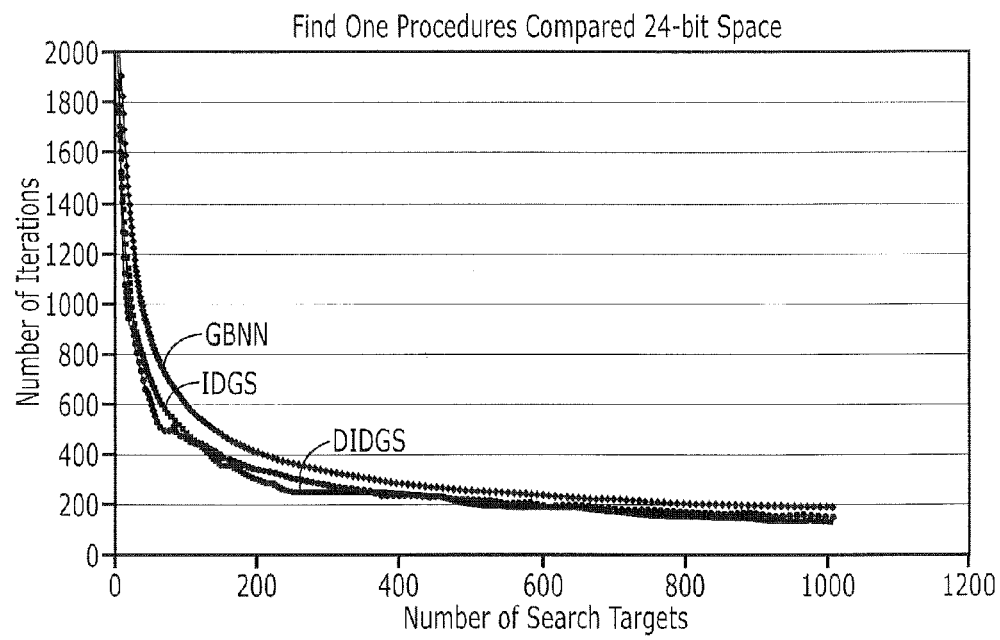
FIGS. 4-9 are graphs illustrating simulated performance of various search techniques.

FIG. 4 shows the iterations costs of the three, graphed against the number of search targets. This graph contains the first 1000 data points for each curve in a 24-bit space (i.e. of total size $2^{24}$). The leftmost 9 data points, extending a factor of three times higher, are omitted for readability. The expectation values may be computed exactly by instrumenting the procedures to accumulate probabilities returned by SimulateGS-Abstract and applying the usual expectation value formula"

$$E = \sum_i i p_i \prod_{j=1}^{i-1} (1 - p_j)$$

where $p_i$ is the search target probability returned at the ith round by SimulateGS-Abstract.

Figure 5:
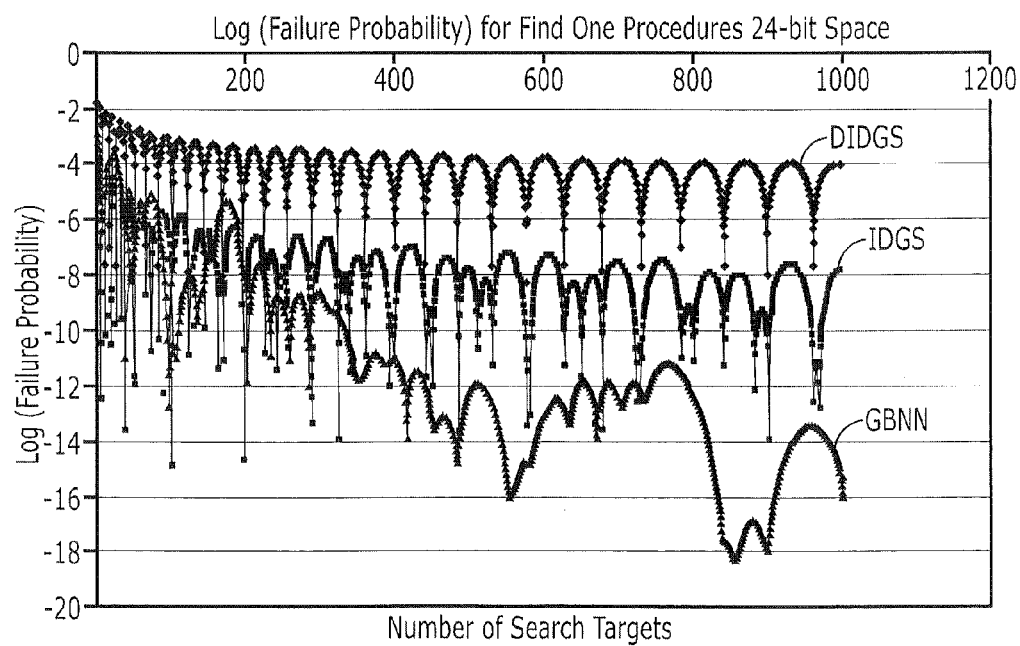

BBHT is the most costly, routinely exceeding the cost of IDGS by 20%. DIDGS, on the other hand, is always below the cost of IDGS by a small but variable amount. This variability is symptomatic of the relatively aggressive step size of DIDGS's deepening schedule. FIG. 5 graphs the (log of) likelihood of failure for each of the three. DIDGS is routinely from 1000 to 10000 times more likely to fail than IDGS. BBHT, on the other hand, is generally less likely to fail than IDGS, but has a few points near the left extreme that go well above IDGS. For example, with exactly one search target, the failure probability is greater than 0.01.

Even though DIDGS's failure probability is usually less than 0.001, this increase over IDGS translates to a marked reliability decrease of DIDGS-mr relative to IDGS-mr and IDGS-FA. In addition, and somewhat surprisingly, this results in DIDGS-mr's cost increasing to well above that of IDGS-FA. For these reasons. DIDGS's lowered reliability outweighs its slight erratic improvement in iterations cost.

The total costs to find all solutions using the other three find all procedures were also compared. The following compares the procedures even under different MARKing schemes. That is, it is not necessarily the case that finding one solution decreases the total target weight by one search target. For example, under the MARKing scheme used for test generation discussed above, each time an input is found that covers a new path, the path is marked, not the input. Thus, all inputs that cover that path are removed. This has the effect of decreasing, the target weight by the number of inputs covering that path. To study this sort of effect, the find all procedures may be instrumented to accept a sequence of target weights, known as an i-Sequence. For an i-Sequence I, at round i of the find all procedure, SimulateGS-Abstract is given as number of search targets the sum of all entries $I_j$ with $j \geq i$. Thus, the usual MARKing scheme is equivalent to simulating an i-Sequence with all 1 entries. The test generation MARKing scheme leads to i-Sequences with entries typically greater than 1.

Figure 6:
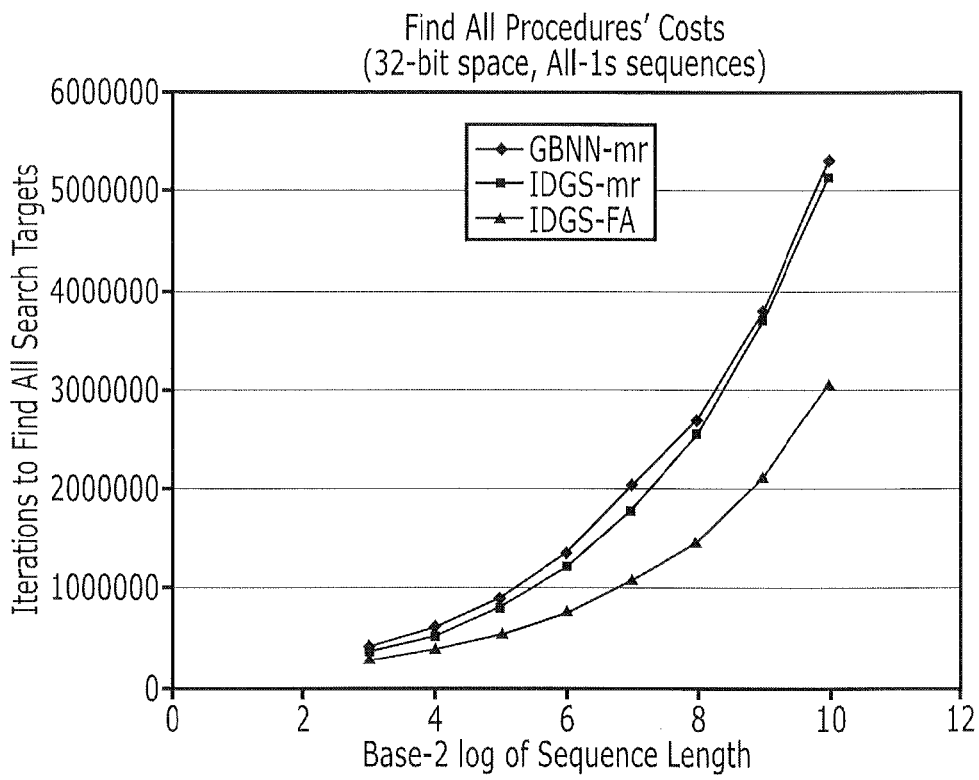
Figure 7:
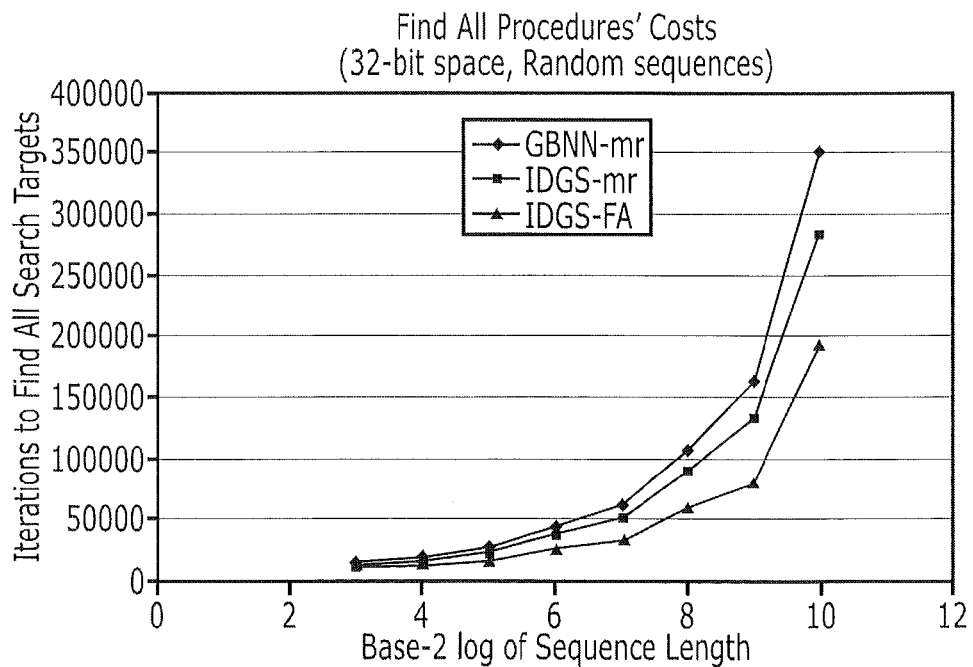

In the first comparison, shown in FIG. 6, i-Sequences having all 1s were used. I ran each of the three procedures on each of eight different i-Sequences with lengths increasing exponentially from 8 to 1024. The graph shows the total cost to find all search targets for each procedure. IDGS-FA is best, with the cost of IDGS-mr (nearest competitor) 34% higher at the low end, increasing up to 67% at the 1024 long i-Sequence. The same comparison was done using i-Sequences with random entries to model the test generation MARKing procedure. The results are shown in FIG. 7. Here. IDGS-FA is once again best, with IDGS-mr increasing from 15% more costly up to 46% at the high end. In both comparisons, BBHT-mr was even more costly compared to IDGS-FA. Thus, BBHT-mr appears to be inferior.

An additional comparison is to quantify which procedure handles the large space problem the best. That is, it is desirable to simulate with a cutoff bound in place and see which procedure finds the most solutions in the available resource. Having eliminated the others as inferior based on previous comparisons, only IDGS-FA and IDGS-mr are compared.

The experiment is defined as follows. Operating within a 32-bit space, an iterations cutoff of 2.000,000 (2e6) iterations is set. That is, each procedure may use a total of 2e6 iterations to find as many solutions as possible. Only i-Sequences having all 1s are considered, although the study could be done for other i-Sequences, but as the previous comparison showed, the results tend to be similar.

Each procedure is run on a selection of i-Sequences in an attempt to cover a representative portion of Zone II. However, this is not well presented in a single graph, so the problem may be broken up. First, FIG. 7 looks at i-Sequence lengths up to ≈32000. This explores the smaller scale region at the left of Zone II, but contains the hardest problems because the target weights are lowest leading to more iterations per solution. FIG. 7 graphs the ratio of the number of solutions found by IDGS-FA to that of IDGS-mr. As shown, this ratio starts out around 1.26, but quickly grows above 1.6, with a maximum near 1.8. Thus, for this subset of Zone IDGS-FA finds between 26% and 80% more solutions than IDGS-mr.

Figure 8:
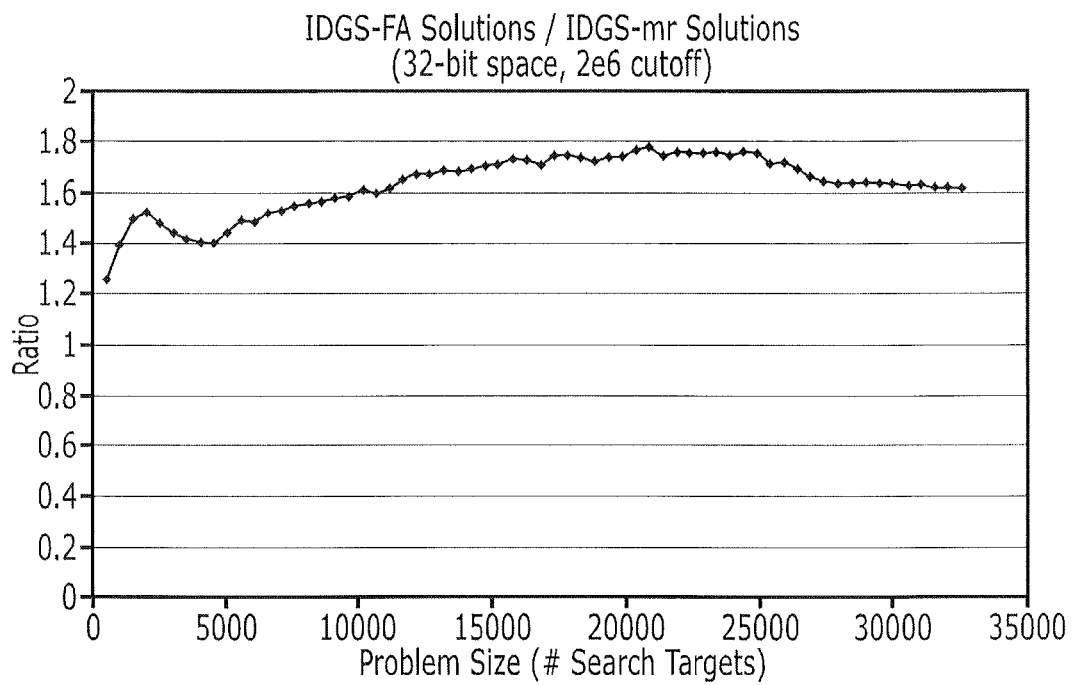
Figure 9:
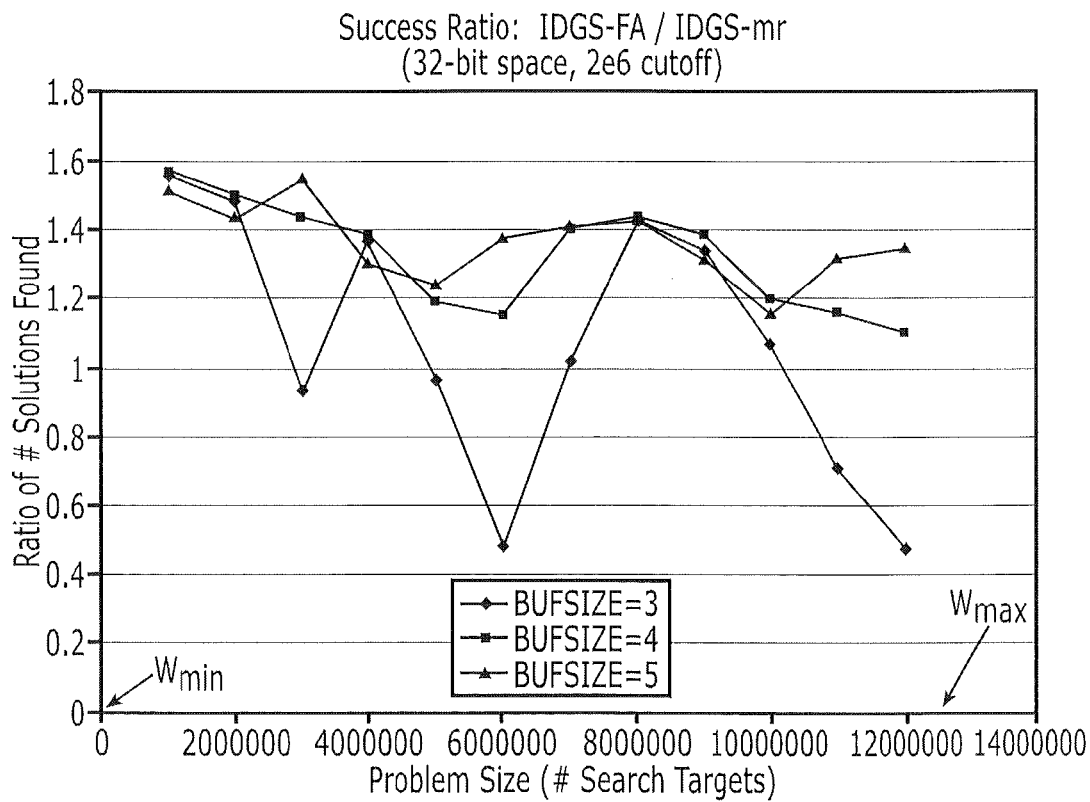

FIG. 8 steps back and looks at performance across the entire width of Zone II, using R=10 to define $w_{max}$ for Zone II. Here, the problem sizes are much larger and, hence, much easier. This graph looks at performance for three different settings of the IDGS-FA buffer size (3, 4, and 5). Clearly, BUFSIZE 5 performs the best. For this setting, IDGS-FA always finds significantly more solutions than IDGS-mr. However, as the problem size moves to the right in Zone II, the advantage drops. This is to be expected because, moving right, the number of iterations per solution found drops to around 16. There doesn't appear to be much to be saved between following the full IDGS deepening schedule to reach 16 and saving the first few rounds of deepening. For hard problems, as at the left end, more iterations are needed and the advantage increases. This also shows that if the buffer size is too small. IDGS-FA can actually find fewer solutions than IDGS-mr; this is because it is relatively easy for random chance to cause IDGS-FA to jump ahead of where it should be in the iteration schedule for optimality. If i gets too big in IDGS, it does not mean failure, just that IDGS will find the solution using extra iterations.

The simulation studies here have focused primarily on a 32-bit problem space size, but have greater generality than that. The iteration cost of GS-based search procedures may depend upon the target weight w rather than the absolute number of search targets directly. Thus, some results may be scaled into other spaces. For example, 1000000 search targets in a 32-bit space corresponds to $$2^{24} 2^{24} \frac{1000000}{2^{32}}$$

search targets in a 24-bit space. Moreover, since the ratios between iteration costs among procedures depends only on number of iterations, and those numbers depend on target weight, the cost ratios may be scaled to other spaces. For example, the simulation shows that IDGS's expected cost for a 1-target search in a 24-bit space is the same (4998 iterations) as that of a 256-target search in a 32-bit space. BBHT scales this way as well, though one must be careful to use the same random state with BBHT, since it has extra randomization in it. DIDGS scales the same way, for spaces with an even number of bits. The scaling is approximate for odd numbers of bits. ISGS, however, does not scale this way, because it starts its search from the worst case search, which is more costly in a larger space. For IDGS, the failure probability does not remain the same as space size increases for fixed target weight. Generally, it drops as space size increases; this is because there are more and more iteration levels, all of which must fail. The failure probability is the product of the failure probabilities of all levels. Thus, it may be concluded that IDGS-FA with buffer size 5 is the best among the candidates reviewed here and best addresses the three challenges: TWI, FA, and LS.

Quantum computing can be successfully applied to SES problems to achieve a quadratic speedup over classical approaches. This quadratic speedup over brute force is achieved on every instance, so this is not a heuristic improvement. While SES problems bring new challenges to applying quantum search, namely the TWI, FA, and LS problems, embodiments of the present invention described herein use IDGS-FA, which is based on Grover's Search Algorithm, to speed up other known candidate solutions to these problems. As shown herein, IDGS-FA may be applied to at least three disparate SES problems, FSM property checking, test generation, and library-based synthesis.

Also described herein are techniques for simulating GS-based search, both concrete and abstract. The abstract version allows simulating in time proportional to the actual achievable run-time cost of GS itself, though answers may not actually be computed with it, only statistics about the operation of the search algorithms themselves. Finally, simulation shows that IDGS may outperform other find-one procedures and that IDGS-FA may outperform other find-all procedures, especially when resource bounds force cutoff.

The basic GS method is known to be optimal to within a constant factor for quantum search. This does not consider the find-all problem; however, it is also known that the find all problem is solvable in $O(\sqrt{Nk})$ iterations, where n is the size of the space and there are k search targets. One can show IDGS-FA achieves this as well. One may wonder about classical heuristic algorithms for the various problems discussed here. For example, one can use IDGS to solve the SAT problem in $O(\sqrt{2^n})$) time. But it is known, for example, that the best 3-SAT algorithm is faster: $O(1:329...^n)$ vs. $O(1:414...^n)$ for IDGS. However, it is also known that one can use the quantum technique of amplitude amplification to adapt the 3-SAT algorithm to a quantum version that uses $O(\sqrt{1.329...^n})$. Furthermore, it is known to adapt some classical heuristics using quantum techniques to achieve quadratic speedups. Genetic algorithms, which can be used for many purposes including, test generation, have a quantum version as well. Therefore, IDGS and IDGS-FA may not solve all problems optimally.

There are many tools for checking properties of FSMs and specifications in other formalisms. IDGS and IDGS-FA could provide a quadratic speedup over classical SAT solvers for problems lying in Zone II. Similarly, there are many classical test generation techniques, many based on heuristics for solving NP hard problems. Such could be supported by IDGS and IDGS-FA to achieve speedups as well.

Many variations and modifications can be made to the embodiments without substantially departing from the principles of the present invention. All such variations and modifications are intended to be included herein within the scope of the present invention, as set forth in the following claims.

That which is claimed:

1. A method of performing a quantum search, comprising:
    performing a first iterative grover search process by causing a quantum computer to perform a first series of grover searches according to a characteristic function comprising a first grover iterate for varying numbers of iterations to identify a first search target;
    for each respective one of the first series of grover searches performing operations as follows:
        determining a first series number of iterations;
        performing the respective one of the first series of grover searches using the first grover iterate when the first series number of iterations does not exceed a first maximum total number of iterations; and
        terminating the respective one of the first series of grover searches when the first series number of iterations exceeds the first maximum total number of iterations;
    modifying the characteristic function according to the first search target so as to remove the first search target as a target subject from subsequent grover searches; and
    performing a second iterative grover search process by causing the quantum computer to perform a second series of grover searches according to the characteristic function that was modified and comprising a second grover iterate for varying numbers of iterations to identify a second search target;
    for each respective one of the second series of rover searches performing operations as follows:
        determining a second series number of iterations based on iterations performed for the first series of grover searches;
        performing the respective one of the second series of grover searches using the second grover iterate when the second series number of iterations does not exceed a second maximum total number of iterations; and
        terminating the respective one of the second series of grover searches when the second series number of iterations exceeds the second maximum total number of iterations;
    wherein each of the first and second iterative grover search processes use one of incrementally increasing and decreasing numbers of iterations for each succeeding one of the first and second series of grover searches, respectively; and
    wherein performing the second iterative grover search process comprises causing the quantum computer to perform the second series of grover searches with the second series number of iterations determined based on a minimum number of iterations among iterations performed to identify respective search targets for a plurality of preceding grover search processes.

2. The method of claim 1, wherein performing the first iterative grover search process comprises identifying a first number of iterations performed to identify the first search target; and
    wherein performing the second iterative grover search process comprises causing the quantum computer to perform the second series of grover searches without performing the first number of iterations.

3. The method of claim 1, wherein performing the second iterative grover search process further comprises causing the quantum computer to perform a third iterative grover search process using a reinitialized number of iterations responsive to failure to find the second search target after reaching a predetermined bound on the number of iterations.

4. The method of claim 1, wherein respective numbers of iterations of each of the first and second iterative grover search processes vary according to a predetermined function for each succeeding one of the first and second series of grover searches, respectively.

5. A computer program product, comprising:
    a non-transitory computer readable medium comprising computer readable program code embodied in the computer readable medium that when executed by a quantum computer processor causes the quantum computer processor to perform operations comprising:
    performing a first iterative grover search process by causing a quantum computer to perform a first series of grover searches according to a characteristic function comprising a first grover iterate for varying numbers of iterations to identify a first search target;

for each respective one of the first series of grover searches performing operations as follows:
  determining a first series number of iterations;
  performing the respective one of the first series of grover searches using the first grover iterate when the first series number of iterations does not exceed a first maximum total number of iterations; and
  terminating the respective one of the first series of grover searches when the first series number of iterations exceeds the first maximum total number of iterations;

modifying the characteristic function according to the first search target so as to remove the first search target as a target subject from subsequent grover searches; and performing a second iterative grover search process by causing the quantum computer to perform a second series of grover searches according to the characteristic function that was modified and comprising a second grover iterate for varying numbers of iterations to identify a second search target;

for each respective one of the second series of grover searches performing operations as follows:
  determining a second series number of iterations based on iterations performed for the first series of grover searches;
  performing the respective one of the second series of grover searches using the second grover iterate when the second series number of iterations does not exceed a second maximum total number of iterations; and
  terminating the respective one of the second series of grover searches when the second series number of iterations exceeds the second maximum total number of iterations;

wherein each of the first and second iterative grover search processes use one of incrementally increasing and decreasing numbers of iterations for each succeeding one of the first and second series of grover searches, respectively; and wherein performing the second iterative &rover search process comprises causing the quantum computer to perform the second series of grover searches with the second series number of iterations determined based on a minimum number of iterations among iterations performed to identify respective search targets for a plurality of preceding grover search processes.

6. The computer program product of claim 5, wherein performing the first iterative grover search process comprises identifying a first number of iterations performed to identify the first search target; and
  wherein performing the second iterative grover search process comprises causing the quantum computer to perform the second series of grover searches without performing the first number of iterations.

7. The computer program product of claim 5, wherein performing the second iterative grover search process further comprises causing the quantum computer to perform a third iterative grover search process using a reinitialized number of iterations responsive to failure to find the second search target after reaching a predetermined bound on the number of iterations.

8. The computer program product of claim 5 wherein respective numbers of iterations of each of the first and second iterative grover search processes vary according to a predetermined function for each succeeding one of the first and second series of grover searches, respectively.

9. A system, comprising:
a quantum computer; and
a memory coupled to the quantum computer and comprising computer readable program code embodied in the memory that when executed by the quantum computer causes the processor to perform operations comprising:

performing a first iterative grover search process by causing a quantum computer to perform a first series of grover searches according to a characteristic function comprising a first grover iterate for varying numbers of iterations to identify a first search target;

for each respective one of the first series of grover searches performing operations as follows:
  determining a first series number of iterations;
  performing the respective one of the first series of grover searches using the first grover iterate when the first series number of iterations does not exceed a first maximum total number of iterations; and
  terminating the respective one of the first series of grover searches when the first series number of iterations exceeds the first maximum total number of iterations;

modifying the characteristic function according to the first search target so as to remove the first search target as a target subject from subsequent grover searches; and performing a second iterative grover search process by causing the quantum computer to perform a second series of grover searches according to the characteristic function that was modified and comprising a second grover iterate for varying numbers of iterations to identify a second search target;

for each respective one of the second series of grover searches performing operations as follows:
  determining a second series number of iterations based on iterations performed for the first series of grover searches;
  performing the respective one of the second series of grover searches using the second grover iterate when the second series number of iterations does not exceed a second maximum total number of iterations; and
  terminating the respective one of the second series of grover searches when the second series number of iterations exceeds the second maximum total number of iterations;

wherein each of the first and second iterative grover search processes use one of incrementally increasing and decreasing numbers of iterations for each succeeding one of the first and second series of grover searches, respectively; and wherein performing the second iterative grover search process comprises causing the quantum computer to perform the second series of grover searches with the second series number of iterations determined based on a minimum number of iterations among iterations performed to identify respective search targets for a plurality of preceding grover search processes.

10. The system of claim 9, wherein performing the first iterative grover search process comprises identifying a first number of iterations performed to identify the first search target; and
  wherein performing the second iterative grover search process comprises causing the quantum computer to perform the second series of grover searches without performing the first number of iterations.

11. The system of claim 9, wherein performing the second iterative grover search process further comprises causing the quantum computer to perform a third iterative grover search using a reinitialized number of iterations responsive to failure to find the second search target after reaching a predetermined bound on the number of iterations.

12. The system of claim 9, wherein respective numbers of iterations of each of the first and second iterative grover search processes vary according to a predetermined function for each succeeding one of the first and second series of grover searches, respectively.

* * * * *

UNITED STATES PATENT AND TRADEMARK OFFICE
CERTIFICATE OF CORRECTION

| | | |
|---|---|---|
| PATENT NO. | : 9,152,922 B2 | Page 1 of 1 |
| APPLICATION NO. | : 12/639557 | |
| DATED | : October 6, 2015 | |
| INVENTOR(S) | : Robert J. Hall | |

It is certified that error appears in the above-identified patent and that said Letters Patent is hereby corrected as shown below:

<u>In the Claims:</u>
Column 20, Claim 1, Line 15: Please correct "rover" to read -- grover --

Column 21, Claim 5, Line 41: Please correct "&rover" to read -- grover --

Signed and Sealed this
Fifteenth Day of March, 2016

Michelle K. Lee
*Director of the United States Patent and Trademark Office*